United States Patent
Shen et al.

(10) Patent No.: US 9,402,027 B2
(45) Date of Patent: Jul. 26, 2016

(54) POWER SUPPLYING METHOD AND APPARATUS

(71) Applicant: HUAWEI DEVICE CO., LTD., Shenzhen (CN)

(72) Inventors: Jun Shen, Shanghai (CN); Wei Lv, Shanghai (CN); Kangjie Chao, Shanghai (CN); Yajun Pan, Shanghai (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 166 days.

(21) Appl. No.: 14/087,574

(22) Filed: Nov. 22, 2013

(65) Prior Publication Data
US 2014/0176790 A1 Jun. 26, 2014

Related U.S. Application Data

(63) Continuation of application No. PCT/CN2012/087159, filed on Dec. 21, 2012.

(51) Int. Cl.
*H04N 5/232* (2006.01)
*H04N 5/225* (2006.01)
(Continued)

(52) U.S. Cl.
CPC .......... *H04N 5/23241* (2013.01); *G06F 1/1686* (2013.01); *G06F 1/26* (2013.01); *H04N 5/2257* (2013.01)

(58) Field of Classification Search
CPC ............ H04N 5/2257; H04N 5/23241; H04N 2005/2255; G06F 1/1686; G06F 1/26
See application file for complete search history.

(56) References Cited

U.S. PATENT DOCUMENTS

| 4,737,812 A | 4/1988 | Hasegawa et al. |
| 5,627,583 A * | 5/1997 | Nakamura et al. ............... 348/72 |
| 6,161,027 A | 12/2000 | Poirel |

(Continued)

FOREIGN PATENT DOCUMENTS

| CN | 101163162 A | 4/2008 |
| CN | 101207329 A | 6/2008 |

(Continued)

OTHER PUBLICATIONS

Extended European Search Report dated Feb. 6, 2015 in corresponding European Patent Application No. 12874923.1.

(Continued)

*Primary Examiner* — Timothy J Henn
(74) *Attorney, Agent, or Firm* — Staas & Halsey LLP

(57) ABSTRACT

A power supplying method and apparatus. The power supplying apparatus includes: a detection module, connected to a detection pin group of a camera module, and configured to generate a recognition signal according to a detected detection signal on the detection pin group of the camera module; a power supply recognition module, connected to the detection module, and configured to recognize a type of the camera module according to the recognition signal, to determine power supply information corresponding to the type of the camera module; a power-on control module, connected to the power supply recognition module and a power supply module, and configured to control a power supply time sequence of at least three power supply units and a power supply voltage of each of the power supply units, so that the at least three power supply units supply power to the camera module.

7 Claims, 5 Drawing Sheets

(51) Int. Cl.
*G06F 1/16* (2006.01)
*G06F 1/26* (2006.01)

(56) References Cited

U.S. PATENT DOCUMENTS

| | | | |
|---|---|---|---|
| 6,295,082 B1* | 9/2001 | Dowdy et al. | 348/72 |
| 6,396,169 B1 | 5/2002 | Voegeli et al. | |
| 2003/0142970 A1 | 7/2003 | Nishida et al. | |
| 2005/0268000 A1* | 12/2005 | Carlson | G06F 13/4081 710/15 |
| 2007/0250648 A1 | 10/2007 | Picard et al. | |
| 2008/0150436 A1 | 6/2008 | Suzuki | 315/169.3 |
| 2012/0198183 A1* | 8/2012 | Wetzel | G06F 11/3013 711/154 |

FOREIGN PATENT DOCUMENTS

| | | |
|---|---|---|
| CN | 101432674 | 5/2009 |
| CN | 101835301 A | 9/2010 |
| JP | 9-90488 | 4/1997 |
| JP | 2010-11608 A | 1/2010 |

OTHER PUBLICATIONS

International Search Report issued Oct. 10, 2013, in corresponding International Patent Application No. PCT/CN2012/087159.

* cited by examiner

POWER SUPPLYING METHOD AND APPARATUS

CROSS-REFERENCE TO RELATED APPLICATIONS

This application is a continuation of International Application No. PCT/CN2012/087159, filed on Dec. 21, 2012, which is hereby incorporated by reference in its entirety

TECHNICAL FIELD

The present invention relates to power management technologies, and in particular, to a power supplying method and apparatus.

BACKGROUND

With the development of integration technologies of a user equipment, such as a mobile phone, the number of cameras configured on the user equipment gradually grows from one to two.

The cameras configured on the user equipment both need multiple power supplies to supply power, but because of the development of camera technologies, cameras equipped with different sensors have different power-on sequence requirements for the multiple power supplies they need. Given that a platform resource used by the user equipment is limited and each power supply cannot supply power individually, so for each of the cameras using different sensors, a power supply circuit in a platform needs to be individually designed, so as to match the power-on sequence of each power supply.

In a development or manufacturing process of the user equipment, because situations such as upgrading or replacing models of the configured cameras may exist, if a power-on sequence of each power supply of a camera after replacement is different from the power-on sequence of the originally configured camera, the power supply circuit on the platform of the user equipment needs to be redesigned, thereby prolonging a development or production cycle.

SUMMARY

Embodiments of the present invention provide a power supplying method and apparatus, which are configured to adaptively supply power to camera modules of different models used by a user equipment.

In a first aspect, a power supplying apparatus is provided, which includes:

a detection module, connected to a detection pin group of a camera module, and configured to generate a recognition signal according to a detected detection signal on the detection pin group of the camera module, where the detection pin group of the camera module is configured to identify a type of the camera module;

a power supply recognition module, connected to the detection module, and configured to recognize the type of the camera module according to the recognition signal, determine power supply information corresponding to the type of the camera module, where the power supply information includes a power supply time sequence of at least three power supply units and a power supply voltage of each power supply unit among the at least three power supply units; and a power-on control module, connected to the power supply recognition module and a power supply module, and configured to control the power supply time sequence of the at least three power supply units of the power supply module and the power supply voltage of each of the power supply units according to the power supply information, so that the at least three power supply units supply power to the camera module.

In a first possible implementation manner of the first aspect, the detection pin group of the camera module includes: a detection pin, an identification resistor and a ground point, where the detection pin is connected to the ground point through the identification resistor;

correspondingly, the detection module includes:

a current source, where an input end of the current source is connected to the detection pin; and an analog-to-digital conversion unit, where an input end of the analog-to-digital conversion unit is connected to an output end of the current source, and an output end of the analog-to-digital conversion unit is connected to the power supply recognition module, and the analog-to-digital conversion unit is configured to generate the recognition signal after performing analog-to-digital conversion on the detection signal.

In combination with the first aspect or the first possible implementation manner of the first aspect, in a second possible implementation manner, the power supply recognition module is specifically configured to query a storage module according to the recognition signal so as to recognize the type of the camera module, to acquire the power supply information corresponding to the type of the camera module, where the storage module stores correspondence of the recognition signal, the type of the camera module and the power supply information.

In combination with any possible implementation manner of the first aspect to the second possible implementation manner of the first aspect, in a third possible implementation manner, the power supplying apparatus further includes:

an address setting module, configured to set an address of the power supplying apparatus according to received address setting information.

In a fourth possible implementation manner of the first aspect, the number of the camera modules connected to the detection module is at least two;

the number of the power supply modules is at least two, and each of the power supply modules is connected between the power-on control module and each of the camera modules;

correspondingly, the power supplying apparatus further includes: a switching module, connected to the at least two camera modules and the detection module, and configured to make the detection module perform detection on each camera module in preset order.

In a second aspect, a camera module is provided, which includes:

a detection pin group, configured to connect to a power supplying apparatus and identify a type of the camera module;

a camera unit, configured to perform imaging; and at least three power supply units, connected to the camera unit and the power supplying apparatus, and configured to receive power supplied by the power supplying apparatus to the camera unit.

In a first possible implementation manner of the second aspect, the detection pin group includes:

a detection pin, an identification resistor and a ground point, where the detection pin group is connected to the ground point through the identification resistor.

In a third aspect, a power supplying method is provided, which includes:

generating a recognition signal according to a detected detection signal on a detection pin group of a camera module, where the detection pin group of the camera module is configured to identify a type of the camera module;

recognizing the type of the camera module according to the recognition signal, to determine power supply information corresponding to the type of the camera module, where the power supply information includes a power supply time sequence of at least three power supply units and a power supply voltage of each power supply unit among the at least three power supply units; and controlling the power supply time sequence of the at least three power supply units and the power supply voltage of each of the power supply units according to the power supply information, so that the at least three power supply units supply power to the camera module.

In a first possible implementation manner of the third aspect, the recognizing the type of the camera module according to the recognition signal to determine the power supply information corresponding to the type of the camera module specifically includes:

querying a camera type database according to the recognition signal so as to recognize the type of the camera module, to acquire the power supply information corresponding to the type of the camera module, where the camera type database stores correspondence of the recognition signal, the type of the camera module and the power supply information.

In a second possible implementation manner of the third aspect, before the generating the recognition signal according to the detected detection signal on the detection pin group of the camera module, the method further includes:

setting an address according to received address setting information.

In combination with any possible implementation manner of the third aspect to the second possible implementation manner of the third aspect, in a third possible implementation manner, the method further includes:

the detected number of the camera modules being at least two;

performing detection on each camera module in preset order; and supplying power to each camera module.

In the power supplying method and apparatus provided by the embodiments of the present invention, by setting the power supplying apparatus in a user equipment, a power supply voltage and a power-on sequence required by the camera module installed on the user equipment is recognized, and power is supplied to the camera module, so as to implement a process of using the same circuit structure to supply power to camera modules of different models used by the user equipment.

BRIEF DESCRIPTION OF DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

The following will clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
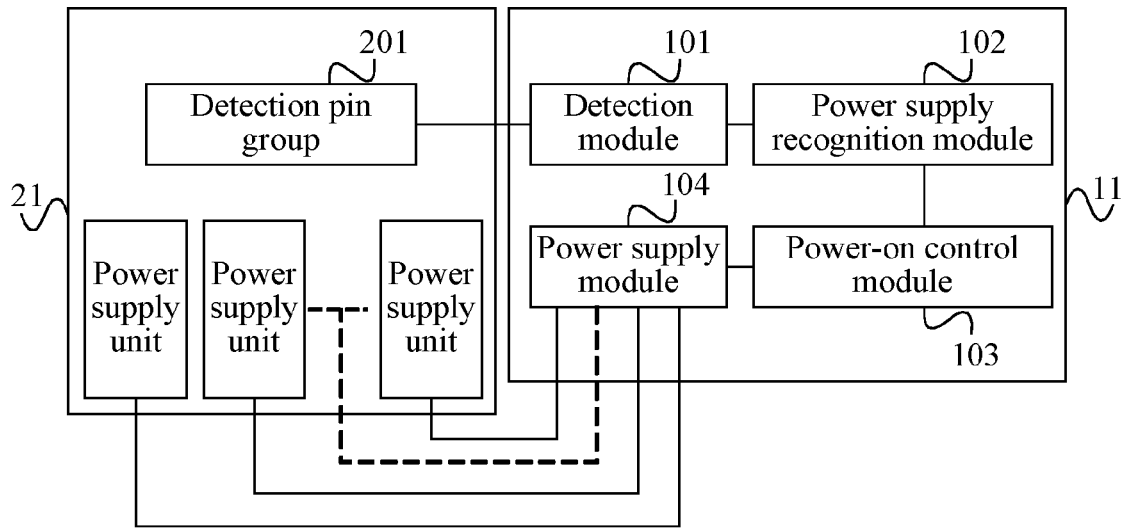
FIG. 1 is a schematic structural diagram of a first embodiment of a power supplying apparatus according to an embodiment of the present invention.

FIG. 1 is a schematic structural diagram of a first embodiment of a power supplying apparatus according to an embodiment of the present invention; as shown in FIG. 1, the power supplying apparatus 11 in this embodiment includes:

a detection module 101, connected to a detection pin group 201 of a camera module 21, and configured to generate a recognition signal according to a detected detection signal on a detection pin group 201 of the camera module 21, where the camera module 21 includes the detection pin group 201 configured to identify a type of the camera module 21; a power supply recognition module 102, connected to the detection module 101, and configured to recognize the type of the camera module 21 according to the recognition signal, to determine power supply information corresponding to the type of the camera module 21, where the power supply information includes a power supply time sequence of at least three power supply units and a power supply voltage of each power supply unit among the at least three power supply units; and a power-on control module 103, connected to the power supply recognition module 102 and a power supply module 104, and configured to control the power supply time sequence of the at least three power supply units of the power supply module 104 and the power supply voltage of each power supply unit, so that the at least three power supply units supply power to the camera module 21.

Specifically, a camera is usually set in a user equipment, such as a mobile phone and a tablet PC; a sensor used by the camera and other external circuits form the camera module 21 together, where the sensor is configured to perform imaging, and is a core element in the camera module 21; the camera module 21 further includes the detection pin group 201 configured to identify the type of the camera module 21; detection pin groups 201 in camera modules of different types are different.

The detection module 101 is connected to the detection pin group 201 in the camera module 21, and the detection module 101 generates the recognition signal by detecting the detection signal on the detection pin group 201; detection signals on different detection pin groups 201 are different, so generated recognition signals are different as well. The power supply recognition module 102 is connected to the detection module 101, and detects, according to the recognition signal generated by the detection module 101, the type of the camera module 21 corresponding to the recognition signal, thereby determining the power supply information corresponding to this type of camera module 21. The sensor used in the camera module 21 can work only when three power supplies including a core power supply, an analog power supply and a digital power supply are turned on at the same time, so the power supply information corresponding to the camera module 21 at least needs to include the power supply voltages of the three power supply units and a power supply time sequence relation of the three power supply units, thereby supplying power to the sensor in the camera module 21, so that the camera module 21 can perform imaging normally. If the external circuit, such as a zoom motor, also needs power supply in addition to the sensor in the camera module 21, the power supply recognition module 102 determines, according to the type of the camera module 21 corresponding to the recognition signal, the power supply voltages and the power supply time sequence of the power supply units required by this type of camera module 21. The power-on control module 103 is connected to the power supply recognition module 102 and the power supply module 104; the power supply module 104 is configured to supply power to the camera module 21; the camera module 21 at least needs three power supplies to supply power, so the power supply module 104 at least includes three power supply units, and the power-on control module 103 controls the power supply time sequence relation among the at least three power supply units of the power supply module 104 and the power supply voltage of each power supply unit according to the power supply information determined by the power supply recognition module 102. The power supply module 104 supplies power to the camera module 21 by using the at least three power supply units controlled according to the power-on control module 103.

In this embodiment, by detecting and recognizing the types of the camera modules, determining to provide different power supply voltages and power-on sequences for different camera modules, and supplying power to the camera modules, a process of adaptively supplying power to camera modules of different models used by a user equipment is implemented.

Figure 2:
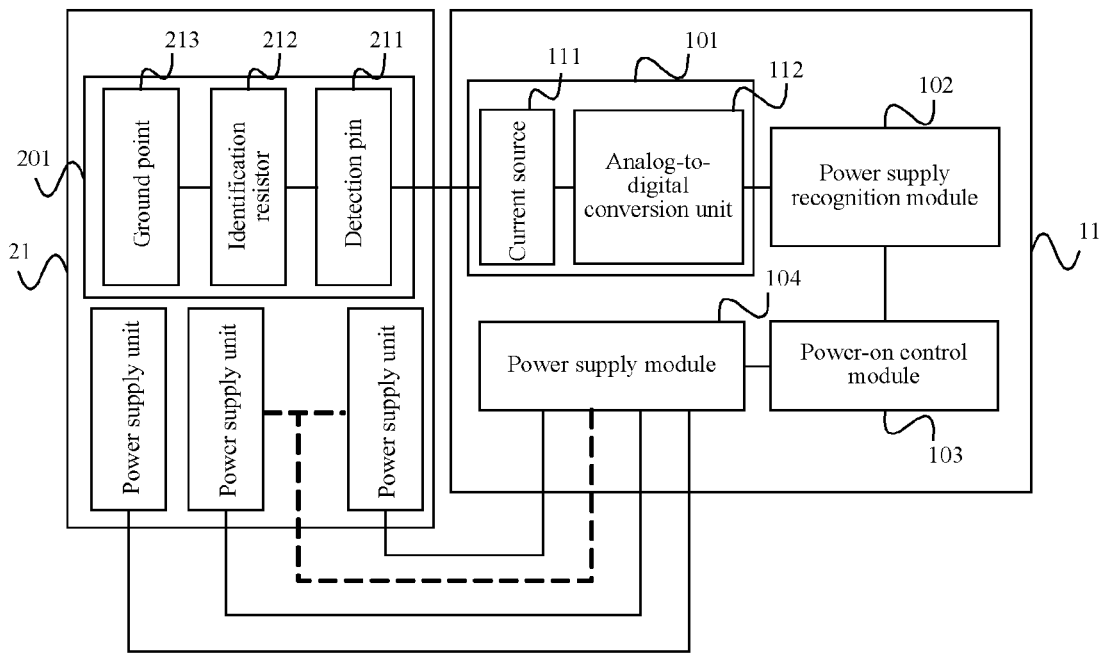
FIG. 2 is a schematic structural diagram of a second embodiment of a power supplying apparatus according to an embodiment of the present invention.

FIG. 2 is a schematic structural diagram of a second embodiment of a power supplying apparatus according to an embodiment of the present invention; as shown in FIG. 2, in the power supplying apparatus 11 shown in FIG. 1, the detection module 101 may specifically include: a current source 111 and an analog-to-digital conversion unit 112.

The detection pin group 201 of the camera module 21 includes: a detection pin 211, an identification resistor 212 and a ground point 213. The detection pin 211 is connected to the ground point 213 through the identification resistor 212.

An input end of the current source 111 is connected to the detection pin 211; an input end of the analog-to-digital conversion unit 112 is connected to an output end of the current source 11, and an output end of the analog-to-digital conversion unit 112 is connected to the power supply recognition module 102, and the analog-to-digital conversion unit 112 is configured to generate the recognition signal after performing analog-to-digital conversion on the detection signal.

Specifically, the detection pin group 201 of the camera module 21 includes the identification resistor 212, and resistance values of identification resistors 212 in different types of camera modules 21 are different, that is to say, the identification resistors 212 are configured to identify camera modules of different types. One end of the identification resistor 212 is connected to the ground point 213, and the other end is connected to the detection pin 211. The input end of the current source 111 in the detection module 101 is connected to the detection pin 211; and the current source 111 is configured to generate a detection current, that is, the detection signal of the detection module 101. Because the identification resistor 212 is connected to the ground point 213, the ground point 213 is connected to the ground in the user equipment, a loop is formed among the current source 111, the identification resistor 212 and the ground, and the detection current generated by the current source 111 generates an identification voltage in the loop after passing through the identification resistor 212. The identification resistors 212 with different resistance values correspond to different identification voltages. The input end of the analog-to-digital conversion unit 112 in the detection module 101 is connected to the output end of the current source 111, so that the analog-to-digital conversion unit 112 is capable of detecting the identification voltage. The analog-to-digital conversion unit 112 converts the detected analog identification voltage to a digital identification value, and sends the digital identification value to the power supply recognition module 102, where the digital identification value is the recognition signal. The power supply recognition module 102 recognizes the type of the camera module 21 according to the identification value.

In this embodiment, the identification resistor is set in the camera module, the identification voltage is generated by using the current source to pass through the identification resistor, and is converted to a recognizable identification value, so as to detect and recognize the type of the camera module, thereby determining the power supply voltages and the power-on sequences for supplying power to the camera module, and supplying power to the camera module; therefore, a process of adaptively supplying power to camera modules of different models used by the user equipment is implemented.

Further, in the power supplying apparatus provided by the present invention, the foregoing embodiments are not taken as a limitation on specific structures of the detection pin group 201 and the detection module 101; the detection module 101 only needs to obtain different identification values by detecting different detection pin groups 201, so that the different identification values can be recognized by the power supply recognition module 102. For example, the ground point 213 in the detection pin group 201 may further be replaced with a second detection pin; by connecting the detection pin 211 and the second detection pin to the two ends of the current source 111 simultaneously, the detection voltage can also be generated on a loop, and converted to the identification value for the power supply recognition module 102 to recognize afterwards.

Figure 3:
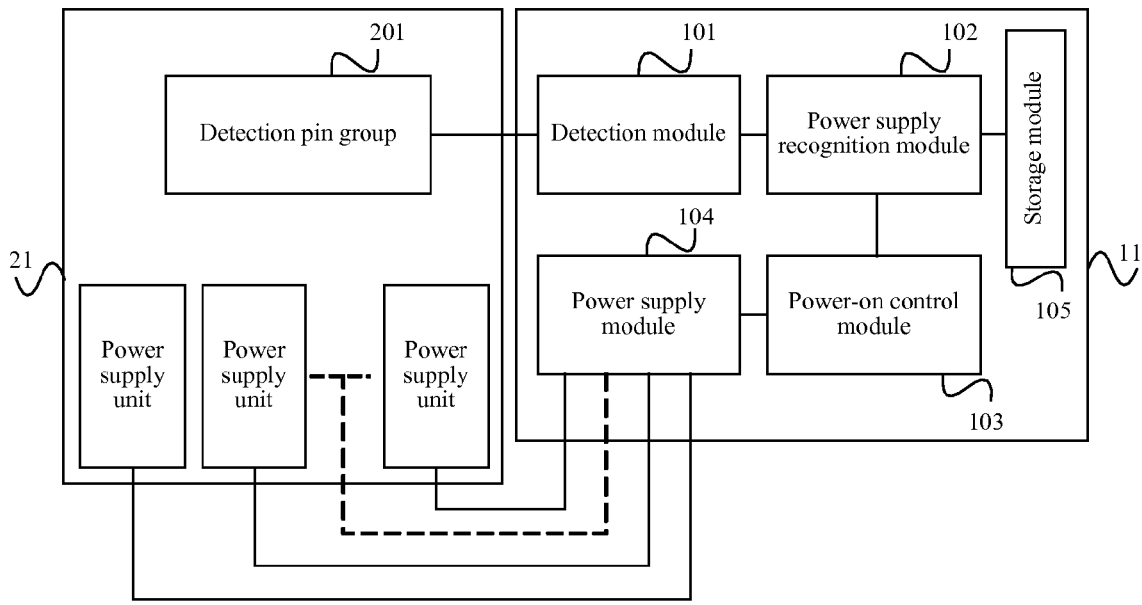
FIG. 3 is a schematic structural diagram of a third embodiment of a power supplying apparatus according to an embodiment of the present invention.

FIG. 3 is a schematic structural diagram of a third embodiment of a power supplying apparatus according to an embodiment of the present invention; as shown in FIG. 3, on the basis of the power supplying apparatus 11 shown in FIG. 1, the power supplying apparatus 11 may further include a storage module 105.

The storage module 105 stores correspondence of a recognition signal, a type of a camera module 21 and power supply information; the power supply recognition module 102 is specifically configured to query the storage module 105 according to the recognition signal so as to recognize the type of the camera module 21, to acquire the power supply information corresponding to the type of the camera module 21.

Specifically, the power supplying apparatus 11 further includes the storage module 105; the storage module 105 stores the correspondence of the recognition signal generated by the detection module 101, the type of the camera module 21 and the power supply information. The power supply information of the camera module 21 includes the power supply time sequence of the at least three power supply units required by the camera module 21 and the power supply voltage of each power supply unit among the at least three power supply units. After receiving the recognition signal sent by the detection module 101, by querying the storage module 105, the power supply recognition module 102 may recognize the type of the camera module 21 and acquire the power supply information required by the camera module 21. In practical application, the storage module 105 may also be implemented as a storage module of a user equipment.

It should be noted that the camera module used in the user equipment, such as a mobile phone, is generally powered by three or four power supplies; power supply voltages required by camera modules of different types are generally several relatively stable voltage values, such as 1.2 V, 1.5 V, 1.8 V and 2.8 V. Therefore, even through camera modules of different types is set in the user equipment, both the power supply voltages and the power-on sequences required by the camera modules are one of a modest number of relatively stable combinations. Therefore, power supply information of the camera modules may be determined by using a method of setting the storage module to store the correspondence of the recognition signal, the type of the camera module and the power supply information in this embodiment, thereby supplying power to different camera modules.

In this embodiment, By pre-storing the correspondence of the recognition signal, the type of the camera module and the power supply information, detecting and recognizing the type of the camera module, determining to provide different power supply voltages and power-on sequences for different camera modules, and providing power for the camera modules, a process of adaptively supplying power to camera modules of different models used by a user equipment is implemented.

Figure 4:
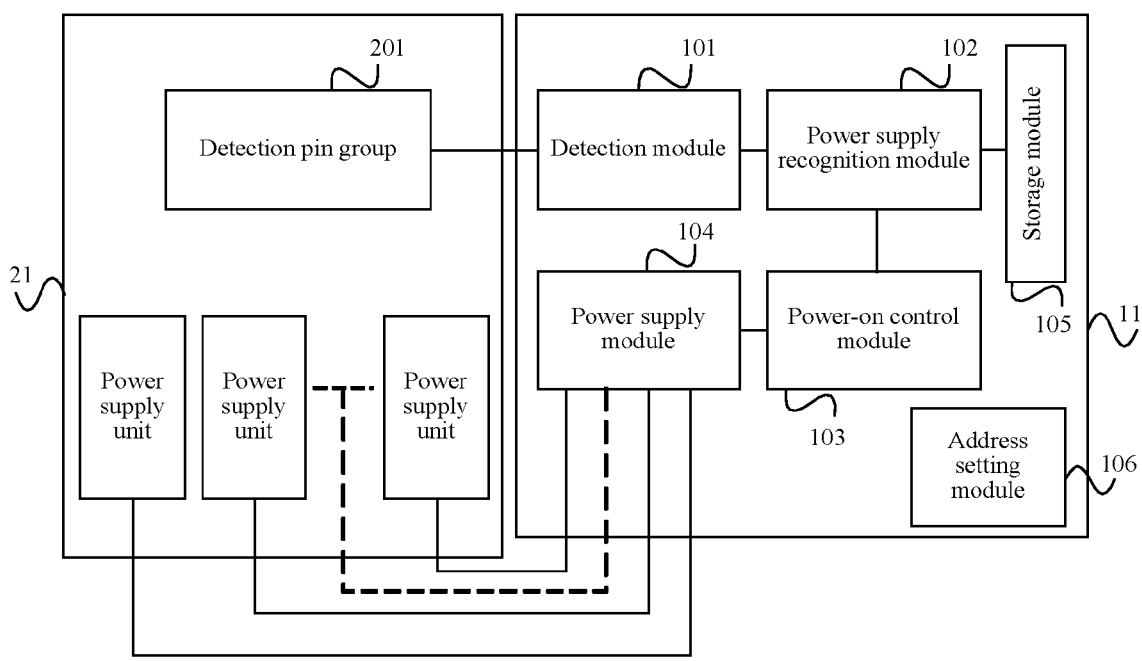
FIG. 4 is a schematic structural diagram of a fourth embodiment of a power supplying apparatus according to an embodiment of the present invention.

FIG. 4 is a schematic structural diagram of a third embodiment of a power supplying apparatus according to an embodiment of the present invention; as shown in FIG. 4, on the basis of the power supplying apparatus 11 shown in FIG. 3, the power supplying apparatus 11 may further include an address setting module 106.

The address setting module 106 is configured to set an address of the power supplying apparatus 11 according to received address setting information.

Specifically, in addition to the camera module 21 and the power supplying apparatus 11, the user equipment further includes multiple other apparatuses; different apparatuses are connected by using an inter-integrated circuit (Inter-Integrated Circuit, I2C) bus, and each apparatus has one I2C address. With the increase of functions of the user equipment, apparatuses integrated in the user equipment are increasingly growing in number, so a problem of I2C address conflict caused by shortage of I2C address resources may arise. Therefore, the address setting module 106 is set in the power supplying apparatus 11 to provide multiple optional I2C addresses for the power supplying apparatus 11. If another apparatus in the user equipment occupies a default I2C address of the power supplying apparatus 11, the default I2C address of the power supplying apparatus 11 may be replaced through the address setting module 106, thereby avoiding address conflict with another apparatus in the user equipment.

In this embodiment, by setting the power supplying apparatus in the user equipment, and setting the address setting module in the power supplying apparatus, address conflict between the power supplying apparatus and another apparatus in the user equipment is avoided at the same time when adaptive power supplying to camera modules of different types used by the user equipment is implemented.

Figure 5:
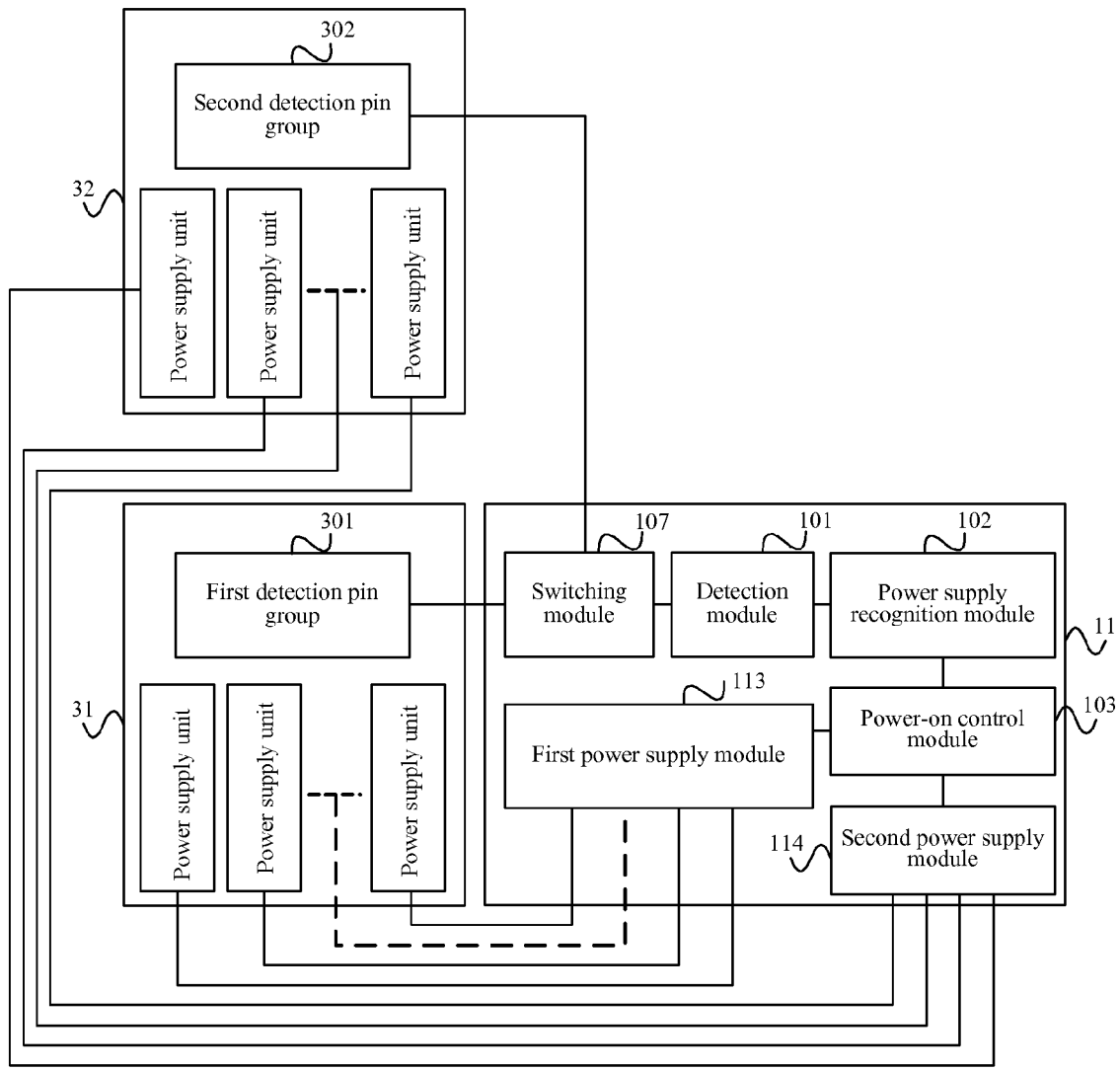
FIG. 5 is a schematic structural diagram of a fifth embodiment of a power supplying apparatus according to an embodiment of the present invention.

FIG. 5 is a schematic structural diagram of a fifth embodiment of a power supplying apparatus according to an embodiment of the present invention. As shown in FIG. 5, on the basis of the power supplying apparatus 11 shown in FIG. 1, if the number of the camera modules 21 is at least two, the number of the power supply modules 104 is at least two, and each power supply module 104 is connected between the power-on control module 103 and a camera module 21; the power supplying apparatus 11 further includes a switching module 107, which is connected to the at least two camera modules 21 and the detection module 101, and configured to make the detection module 101 perform detection on each camera module 21 in preset order.

Specifically, generally two camera modules 21 is set in the user equipment, that is, a primary camera module 31 and a secondary camera module 32, where the primary camera module 31 includes a first detection pin group 301, and the secondary camera module 32 includes a second detection pin group 302. If two camera modules exist, the number of the power supply modules 104 is also at least two, that is, a first power supply module 113 and a second power supply module 114; the first power supply module 113 is connected between the power-on control module 103 and the primary camera module 31, and configured to supply power to the primary camera module; the second power supply module 114 is connected between the power-on control module 103 and the secondary camera module 32, and configured to supply power to the secondary camera module. The power supplying apparatus 11 further includes a switching module 107, which connects the primary camera module 31 and the secondary camera module 32 to the detection module 101. The detection module needs to perform detection on the primary camera module 31 and the secondary camera module 32, so the switching module 107 switches connections between the detection module 101 and the different camera modules, so that the detection module 101 performs detection on each camera module in the preset order.

It should be noted that the number of the power supply modules 104 in the power supplying apparatus 11 is determined according to the number of the camera modules 21; each power supply module 104 supplies power to one camera module 21; the switching module 107 connects each camera module 21 to the detection module 101, so that the detection module 101 performs detection on each camera module 21. The detection module 101 generally performs detection on multiple camera modules 21 according to a preset time-division multiplexing rule, so the switching module 107 also make the detection module 101 switch connections among the multiple camera modules 21 according to the preset time-division multiplexing rule.

In this embodiment, by setting the switching module, detecting and recognizing the types of at least two camera modules, determining to provide different power supply voltages and power-on sequences for the at least two different camera modules, and supplying power to the at least two camera modules, a process of adaptively supplying power to the at least two camera modules of different models used by a user equipment is implemented.

It should be noted that the power supplying apparatus provided by the embodiments of the present invention may be implemented by using integrated chip technology. The detection module, the power supply recognition module, the power-on control module, the power supply module, the storage module, the address setting module and the switching module may be designed on one integrated chip as required, thereby completing the technical solutions of the power supplying apparatus in the foregoing embodiments. Preferably, the detection module, the power-on control module, the power supply module, the address setting module and the switching module are designed as one power supply chip; the function of the power supply recognition module is fulfilled by using a master chip of the user equipment, and the function of the storage module is fulfilled by using a memory in the user equipment, thereby optimizing the design of the power supply chip. For example, one power supply chip is designed for a user equipment using a primary camera and a secondary camera, where a primary camera module needs four power supplies to supply power, and a secondary camera module needs three power supplies to supply power. The power supply chip includes a detection module and a switching module; the detection module connects to detection pin groups in the primary and secondary camera modules through the switching module by using two pins of the chip, so as to obtain recognition signals corresponding to the primary and secondary camera modules; the power supply chip sends the detected recognition signals to a master chip of the user equipment through an I2C bus by using two other pins, for the master chip to recognize types of the primary and secondary camera modules and determine power supply information of the primary and secondary cameras; a power-on control module of the power supply chip receives, through the I2C bus, the power supply information of the primary and secondary camera modules sent by the master chip, and controls each power supply unit in the power supply chip to supply power to the primary and secondary camera modules; seven power supply units are set in the power supply chip, where four power supply units are connected to the primary camera module through corresponding pins of the power supply chip, and the other three power supply units are connected to the secondary camera module through corresponding pins of the power supply chip, so as to supply power, according to an instruction of the power-on control module, to the primary and secondary cameras according to power supply time sequences and the power supply voltages required by the primary and secondary camera modules; the power supply chip further includes an address setting module, and allocates two chip pins for the address setting module; if a default I2C address of the power supply chip has conflict with that of another module in the user equipment, the default I2C address of the power supply chip is changed by changing voltage on one or two pins allocated for the address setting module.

Figure 6:
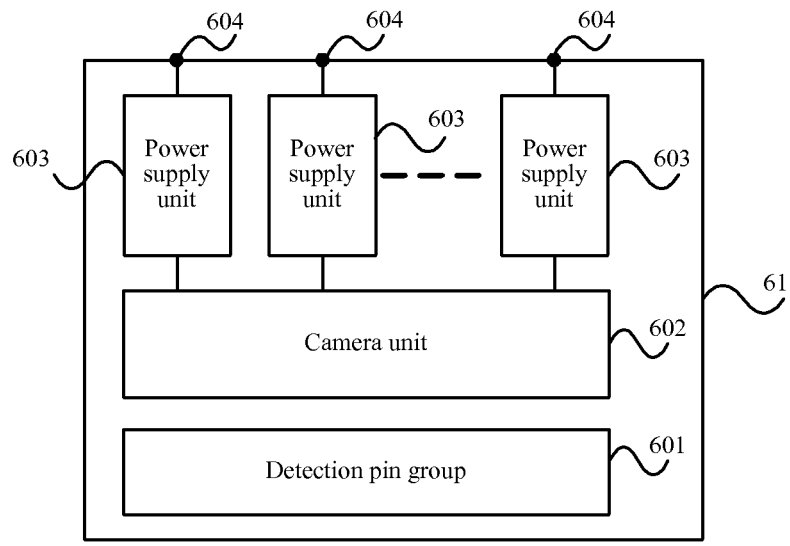
FIG. 6 is a schematic structural diagram of a first embodiment of a camera module according to an embodiment of the present invention.

FIG. 6 is a schematic structural diagram of a first embodiment of a camera module according to an embodiment of the present invention. As shown in FIG. 6, a camera module 61 in this embodiment includes:

a detection pin group 601, configured to connect to a power supplying apparatus, and identify a type of a camera module 61; a camera unit 602, configured to perform imaging; and a power supply unit 603, connected to the camera unit 602 and the power supplying apparatus, and configured to receive power supplied by the power supplying apparatus to the camera unit 602.

Specifically, the power supplying apparatus 62 includes any one of the power supplying apparatuses in the embodiments shown in FIG. 1 to FIG. 5. The camera unit 602 includes all modules completing imaging and zooming functions in the camera module 61; except the camera unit 602, none of other units and modules in the camera module 61 needs a power supply to supply power; the number of the power supply units 603 is the same as the number of power supplies required by the camera unit 602. In general, a sensor used for imaging in the camera unit 602 needs three power supplies, and some camera units 602 may further provide a zooming function; a zoom motor used for zooming needs one power supply. Therefore, the number of the power supply units 603 is generally 3 or 4. The power supply units 603 are connected to the power supplying apparatus through power pins 604, and receive power supplied by power supply modules in the power supplying apparatus.

This embodiment enables the power supplying apparatus to detect and recognize a type of a camera modules by setting a detection pin group in the camera modules, thereby determining a power supply voltage and power-on sequence provided for the camera modules, and supplying power to the camera modules.

Figure 7:
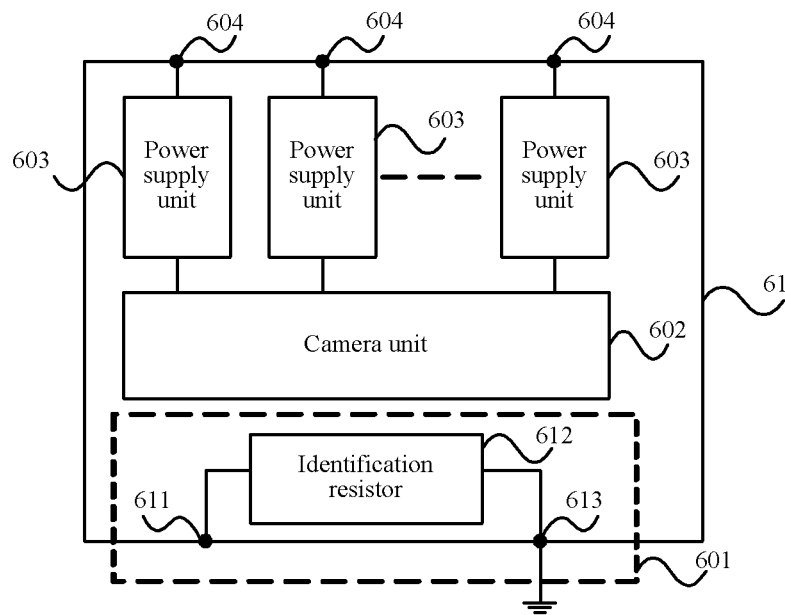
FIG. 7 is a schematic structural diagram of a second embodiment of a camera module according to an embodiment of the present invention.

FIG. 7 is a schematic structural diagram of a second embodiment of a camera module according to an embodiment of the present invention. As shown in FIG. 7, on the basis of the camera module 61 shown in FIG. 6, the detection pin group 601 includes a detection pin 611, an identification resistor 612 and a ground point 613; the detection pin 611 is connected to the ground point 613 through the identification resistor 612. The detection pin 611 is configured to connect to the power supplying apparatus; the identification resistor 612 is configured to identify the type of the camera module 61; the ground point 613 is configured for grounding; the detection pin 611 and the ground point 613 provide a current loop for the power supplying apparatus to detect the type of the camera module 61. In practical application, the detection pin 611, the ground point 613 and the power pin 604 may be set in one connector together, so as to serve as pins of the connector; the camera module 61 is installed in a user equipment through the connector, and connected to another apparatus in the user equipment through each pin, thereby completing power supplying and recognition of the camera module 61. In addition, the camera module 61 may further complete data transmission with other apparatuses in the user equipment through the pins in the connector.

The camera module 61 of this embodiment is the same as the camera module 21 in the embodiment shown in FIG. 2 in terms of structure and function, but the details are not described here again.

It should be noted that the detection pin group in the camera module may have multiple implementation manners; the number of the detection pins may be one or more, for example, the number of the detection pins is two, one identification resistor may be connected between the two detection pins, and identification resistors with different resistance values may identify the types of the camera modules. Correspondingly, the detection module of the power supplying apparatus may be a circuit structure capable of correspondingly detecting different detection signals generated by the identification resistors. For example, one end of a current source may be connected to one detection pin, and the other end of the current source may be connected to the ground point and another detection pin, and then detects potentials generated by the identification resistors, thereby obtaining recognition signals after analog-to-digital conversion. This embodiment is not taken as a limitation of implementation manners of the camera module and the detection module.

Figure 8:
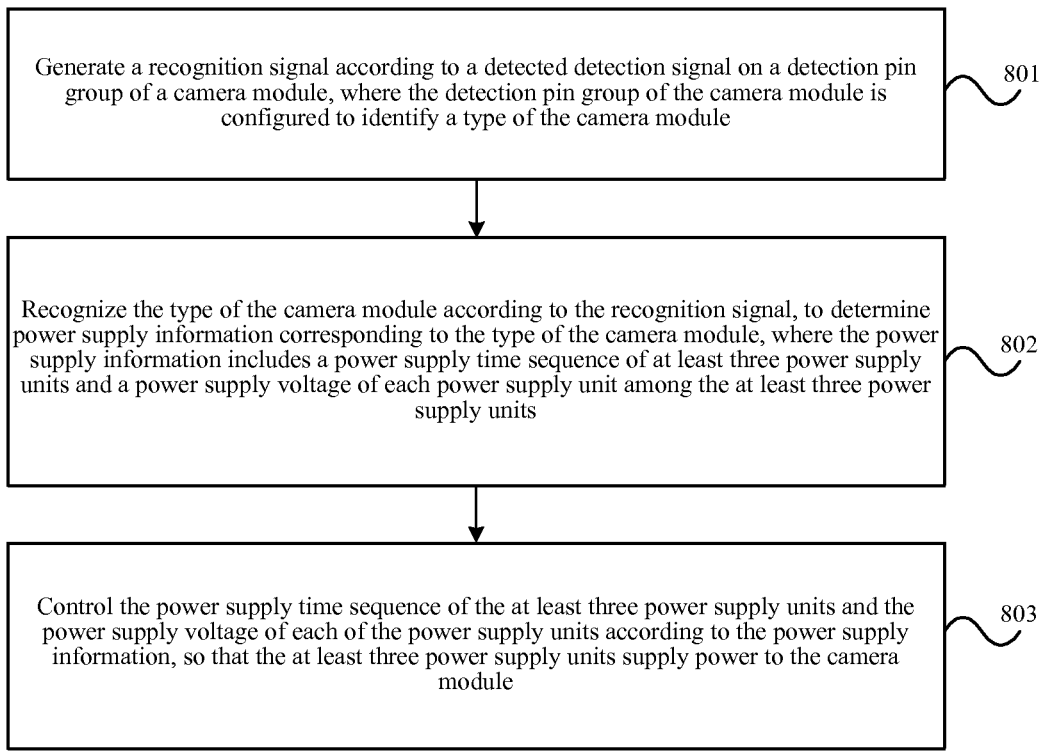
FIG. 8 is a flowchart of a first embodiment of a power supplying method according to an embodiment of the present invention.

FIG. 8 is a flowchart of a first embodiment of a power supplying method according to an embodiment of the present invention. As shown in FIG. 8, the method includes:

801: Generate a recognition signal according to a detected detection signal on a detection pin group of a camera module, where the detection pin group of the camera module is configured to identify a type of the camera module.

802: Recognize the type of the camera module according to the recognition signal, to determine power supply information corresponding to the type of the camera module, where the power supply information includes a power supply time sequence of at least three power supply units and a power supply voltage of each power supply unit among the at least three power supply units.

803: Control the power supply time sequence of the at least three power supply units and the power supply voltage of each of the power supply units according to the power supply information, so that the at least three power supply units supply power to the camera module.

The method of this embodiment is used to implement the technical solution of the apparatus embodiment shown in FIG. 1, and has a similar implementation principle and technical effect, but the details are not described here again.

Figure 9:
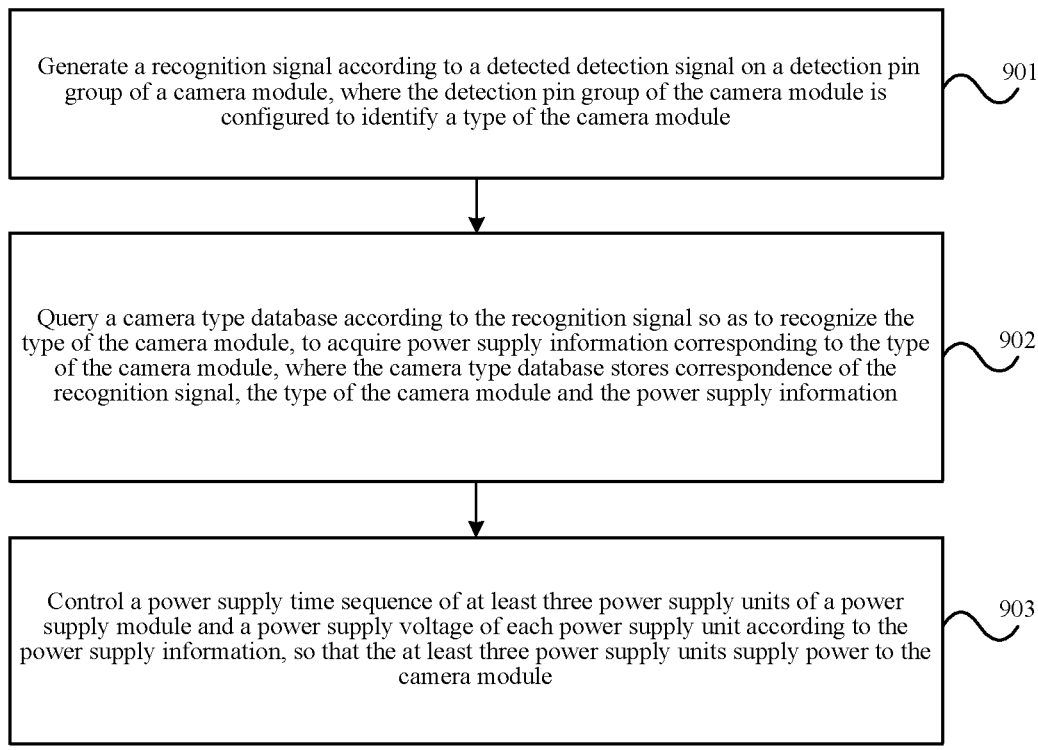
FIG. 9 is a flowchart of a second embodiment of a power supplying method according to an embodiment of the present invention.

FIG. 9 is a flowchart of a second embodiment of a power supplying method according to an embodiment of the present invention. As shown in FIG. 9, the method includes:

901: Generate a recognition signal according to a detected detection signal on a detection pin group of a camera module, where the detection pin group of the camera module is configured to identify a type of the camera module.

902: Query a camera type database according to the recognition signal so as to recognize the type of the camera module, to acquire power supply information corresponding to the type of the camera module, where the camera type database stores correspondence of the recognition signal, the type of the camera module and the power supply information.

903: Control a power supply time sequence of at least three power supply units of a power supply module and a power supply voltage of each power supply unit according to the power supply information, so that the at least three power supply units supply power to the camera module.

The method of this embodiment is used to implement the technical solution of the apparatus embodiment shown in FIG. 3, and has a similar implementation principle and technical effect, but the details are not described here again.

Further, before 801 in the method embodiment shown in FIG. 8, the power supplying method of the present invention further includes: setting an address according to received address setting information. It is used to avoid address conflict between the power supplying apparatus and another apparatuses in a user equipment at the same time of implementing adaptive power supplying to camera modules of different models used by the user equipment.

Further, in practical application, the user equipment usually has two camera modules, so in the method embodiments shown in FIG. 8 and FIG. 9, if the number of the detected camera modules is at least two, detection is performed on each camera module in preset order, and after obtaining the type of each camera module by detecting, the power supply module is used to supply power to each camera module.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions; and such modifications or replacements do not cause the essence of corresponding technical solutions to depart from the scope of the technical solutions of the embodiments of the present invention.

What is claimed is:

1. A power supplying apparatus, comprising:
one or more processors;
a detector, connected to a detection pin group of a camera module, and configured to generate a recognition signal according to a detected detection signal on the detection pin group of the camera module, wherein the detection pin group of the camera module is configured to identify a type of the camera module;
a power supply recognition module, executed by at least one of the processors, connected to the detector, and configured to recognize the type of the camera module according to the recognition signal, to determine power supply information corresponding to the type of the camera module, wherein the power supply information comprises a power supply time sequence of at least three power supply units and a power supply voltage of each power supply unit among the at least three power supply units; and
a controller, executed by at least one of the processors, connected to the power supply recognition module and a power supply module, and configured to control the power supply time sequence of the at least three power supply units of the power supply module and the power supply voltage of each of the power supply units according to the power supply information, so that the at least three power supply units supply power to the camera module, wherein
the detection pin group of the camera module comprises a detection pin, an identification resistor and a ground point; the detection pin is connected to the ground point through the identification resistor;
correspondingly, the detector comprises:
a current source, wherein an input end of the current source is connected to the detection pin; and
an analog-to-digital conversion unit, wherein an input end of the analog-to-digital conversion unit is connected to an output end of the current source, and an output end of the analog-to-digital conversion unit is connected to the power supply recognition module, and the analog-to-digital conversion unit is configured to generate the recognition signal after performing analog-to-digital conversion on the detection signal.

2. The power supplying apparatus according to claim 1, wherein the power supply recognition module is specifically configured to query a storage module according to the recognition signal so as to recognize the type of the camera module, to acquire the power supply information corresponding to the type of the camera module, wherein the storage module stores correspondence of the recognition signal, the type of the camera module and the power supply information.

3. The power supplying apparatus according to claim 1, wherein the power supply recognition module is specifically configured to query a storage module according to the recognition signal so as to recognize the type of the camera module, to acquire the power supply information corresponding to the type of the camera module, wherein the storage module stores correspondence of the recognition signal, the type of the camera module and the power supply information.

4. The power supplying apparatus according to claim 1, further comprising:
an address setting module, executed by at least one of the processors, configured to set an address of the power supplying apparatus according to received address setting information.

5. The power supplying apparatus according to claim 1, further comprising:
an address setting module, executed by at least one of the processors, configured to set an address of the power supplying apparatus according to received address setting information.

6. The power supplying apparatus according to claim 2, further comprising:
an address setting module, executed by at least one of the processors, configured to set an address of the power supplying apparatus according to received address setting information.

7. The power supplying apparatus according to claim 1, wherein the number of the camera modules connected to the detector is at least two;
the number of the power supply modules is at least two, and each of the power supply modules is connected between the controller and each of the camera modules;
correspondingly, the power supplying apparatus further comprises:
a switching module, executed by at least one of the processors, connected to the at least two camera modules and the detector, and configured to make the detector perform detection on each camera module in preset order.

\* \* \* \* \*